UNITED STATES PATENT OFFICE.

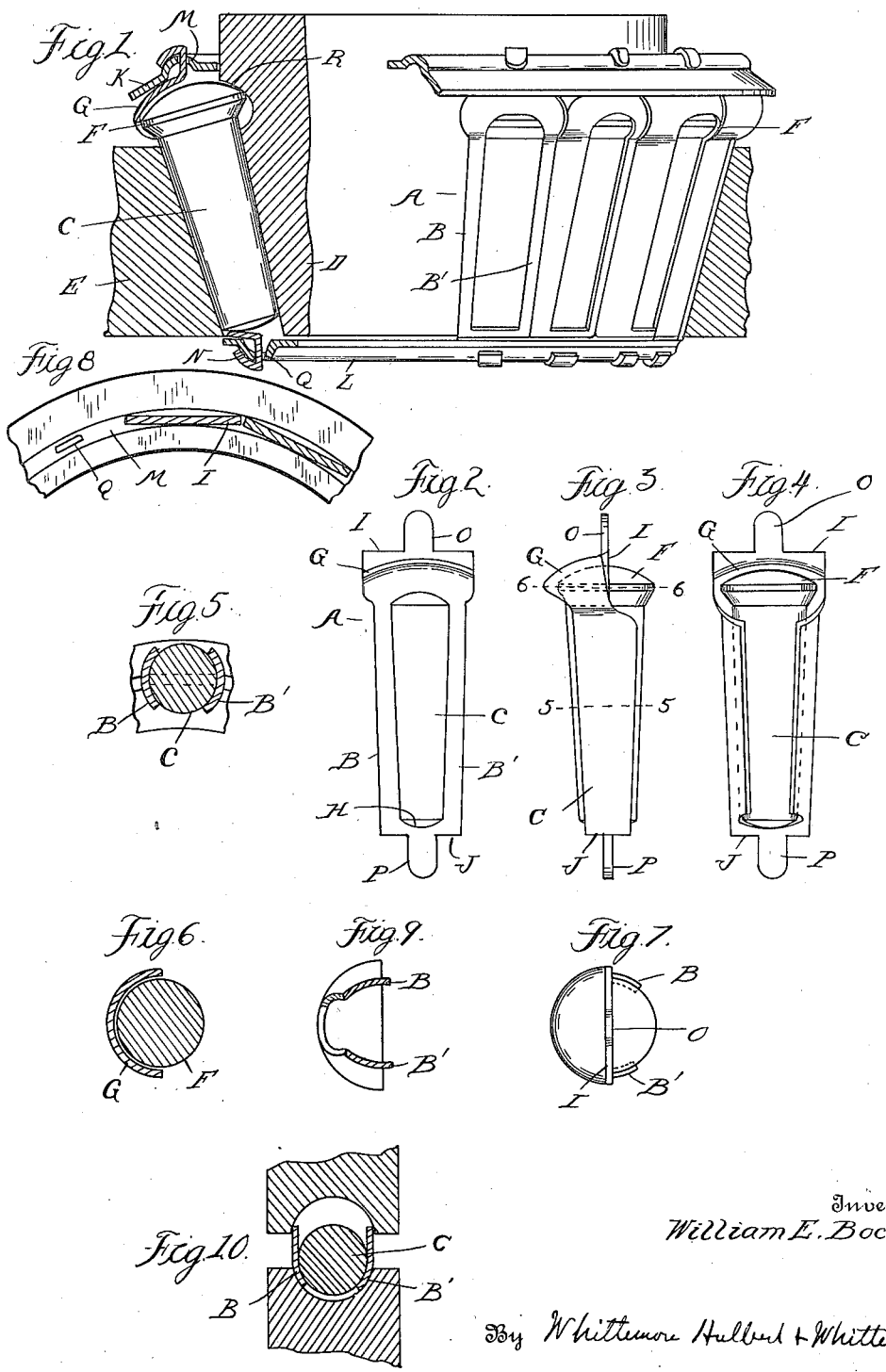

WILLIAM E. BOCK, OF TOLEDO, OHIO, ASSIGNOR TO THE BOCK BEARING COMPANY, OF TOLEDO, OHIO, A CORPORATION OF OHIO.

METHOD OF FORMING ROLLER-BEARING UNITS.

1,320,373.     Specification of Letters Patent.     Patented Nov. 4, 1919.

Original application filed May 27, 1916, Serial No. 100,231. Divided and this application filed July 30, 1917. Serial No. 183,525.

*To all whom it may concern:*

Be it known that I, WILLIAM E. BOCK, a citizen of the United States of America, residing at Toledo, in the county of Lucas and State of Ohio, have invented certain new and useful Improvements in Methods of Forming Roller-Bearing Units, of which the following is a specification, reference being had therein to the accompanying drawings.

The invention relates to the manufacture of roller bearings and has particular reference to the method of assembling and caging the rolls for holding the same in predetermined relation. In the present state of the art it is usual to separate the rolls of a roller bearing by a cage or spacer, which is so formed as to receive the entire series of rolls and to retain the same in a predetermined relation. With my improved method the rolls are first individually housed or placed in retaining cells and these cells are then assembled and secured in the proper relation to each other to produce the spacing desired.

My invention is applicable to various types of roller bearings and rolls therefor, but as shown is applied to a specific type, in which the rolls have conical portions forming the radial thrust bearings and enlarged heads forming end thrust bearings.

The present application is a division of my co-pending application Serial No. 100,231 filed May 27, 1916 for roller bearing unit.

In the drawings:

Figure 1 is a sectional elevation of a roller bearing;

Figs. 2, 3 and 4 are respectively a front elevation, side elevation and rear elevation of one of the roll-holding cells;

Figs. 5 and 6 are cross-sections on line 5—5 and 6—6 Fig. 3;

Fig. 7 is an end elevation of one of the cells;

Fig. 8 is a sectional elevation of a portion of one of the rings of the cage, showing the manner of engaging the individual cells therewith;

Fig. 9 is a cross-section through one of the cells showing the manner of engaging the roll therewith; and Fig. 10 is a similar view, showing the manner of closing the cell to retain the roll.

In detail, A are the individual roller-holding cells, preferably formed of pressed sheet-metal and having segmental side portions B and B' extending longitudinally of the rolls and cut away sufficiently to provide clearance for the bearing of the rollers C upon the race members D and E. As specifically shown, the rollers C are of conical form and are provided at their large ends with spherical heads F forming thrust bearings, the point of contact being in alinement with the bearing on the side of the roll. The cells A are formed to accommodate this construction of roll and are therefore provided at their large ends with a segmental spherical portion G fitting around the head F and connecting the segmental sides B and B', and at their small ends with a connecting portion H. The portions G and H are also provided with outwardly-extending portions I and J for engagement with rings K and L, which hold the individual cells in assembled relation to each other. Preferably the rings K and L are also formed of pressed sheet-metal and are provided with grooved portions M and N for respectively receiving the projecting portions I and J of the cells. The portions I and J are further provided with tongue portions O and P of lesser width, which pass through apertures Q in the grooved portions of the rings and are then bent over to form a lock.

In the method of assembling the bearing, the cells are first formed with the sides B and B' thereof sufficiently open to receive the rolls, as shown in Fig. 9. The rolls are then placed in the cells and the sides closed in, as shown in Fig. 7, so as to retain the rolls from disengagement. The cells are then assembled with the rings K and L, the tongues O and P being inserted through the apertures Q and then bent over. The grooves M and N, engaging the projecting portions I and J, will hold the cells from twisting or turning, while the bent tongues O and P retain the parts in engagement. The ring K provides clearance for the thrust bearing R on the race member D, and the ring L clears both race members D and E, while the individual cells are also cut away to clear said race members, both for the radial bearings and the end thrust.

What I claim as my invention is:

1. The method of forming roller bearing units comprising the forming of individual roller-holding housings or cells having their axes coincident with the axes of the rolls to be placed therein and assembling said cells in relation to each other.

2. The method of forming roller bearing units comprising the forming of the individual roll-holding cells, the axis of each cell being coincident with the axis of the roll to be placed therein, assembling said cells in pre-determined relation to each other and connecting said cells to each other while thus assembled.

3. The method of forming roller bearing units, comprising placing the rollers in individual housings or cells, and assembling said cells in relation to each other.

4. The method of forming roller bearing units, comprising the forming of individual open roll-holding cells, placing the rolls therein, closing the cells about said rolls, and assembling the roll-containing cells in relation to each other.

5. The method of forming roller bearing units, comprising placing the rolls in individual housings or cells, assembling the cells in a predetermined relation to each other and connecting the cells to hold the same in the desired relation.

6. The method of forming roller bearing units comprising the assembling of the rollers individually in housing or cells, and the assembling of said housings or cells in relation to each other.

7. The method of forming roller bearing units, comprising the assembling of rollers in housings or cells, and the assembling of said housings or cells in relation to each other.

In testimony whereof I affix my signature.

WILLIAM E. BOCK.